(12) United States Patent
Kobayashi et al.

(10) Patent No.: US 6,344,518 B1
(45) Date of Patent: Feb. 5, 2002

(54) CONJUGATED DIOLEFIN COPOLYMER RUBBER AND RUBBER COMPOSITION

(75) Inventors: Naokazu Kobayashi; Toshihiro Tadaki; Hiroshi Akema, all of Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/433,200

(22) Filed: Nov. 4, 1999

(30) Foreign Application Priority Data

Nov. 10, 1998 (JP) ............................................. 10-319647

(51) Int. Cl.$^7$ ....................... C08L 83/06; C08F 236/10; L08K 5/03
(52) U.S. Cl. ...................... 524/862; 524/865; 524/484; 524/490; 524/491; 524/492; 526/279; 526/340; 526/347; 525/332.9; 525/332.8; 525/333.1
(58) Field of Search ........................... 525/332.9, 332.8, 525/333.1, 366, 367; 524/474, 484, 490, 491, 492, 862, 865; 526/279, 335, 340, 347

(56) References Cited

U.S. PATENT DOCUMENTS 6,191,234 B1 * 2/2001 Tadaki et al. ............ 525/332.9

FOREIGN PATENT DOCUMENTS

| EP | 0 890 580 | 1/1999 |
| EP | 0 890 580 A1 * | 1/1999 |

OTHER PUBLICATIONS

Derwent Abstract, AN 97–486446/199745, JP 9227636, Sep. 2, 1997.
Derwent Abstract, AN 95–233278/199531, EP 661298, Jul. 5, 1995.
Derwent Abstract, AN 94–242358/199430, EP 609010, Aug. 3, 1994.
Derwent Abstract, AN 91–275676/199138, EP 447066, Sep. 18, 1991.
Derwent Abstract, AN 89–071719/198910, JP 1022940, Jan. 25, 1989.
Derwent Abstract, AN 88–220295/198831, WO 8805448, Jul. 28, 1988.
Derwent Abstract, AN 84–091610/198415, JP 59038209, Mar. 2, 1984.
Derwent Abstract, AN 83–797460/198343, JP 58154742, Sep. 14, 1983.

* cited by examiner

*Primary Examiner*—David W. Wu
*Assistant Examiner*—R. Harlan
(74) *Attorney, Agent, or Firm*—Oblon, Spivak, McClelland, Maier & Neustadt, P.C.

(57) ABSTRACT

A conjugated diolefin copolymer rubber and a rubber composition which can produce vulcanized products exhibiting well-balanced improved properties such as wet skid properties, low hysteresis loss properties, abrasion resistance, and breaking strength irrespective of the types and combinations of fillers to be added, and is useful as a tread material for low fuel consumption tires, large tires, and high performance tires. A conjugated diolefin copolymer rubber is prepared by the copolymerization of a conjugated diolefin and a vinyl aromatic compound, and (1) has a content of the bonded vinyl aromatic compound of 5–50 wt %, (2) contains 0.01–5.0 mmol of an alkoxysilyl group having substantially non-hydrolyzable Si—O—R bond (wherein R indicates a hydrocarbon group having 4–20 carbon atoms) and 0.01–2.0 mmol of a tin-carbon bond for 100 g of the copolymer rubber, and (3) has a polymodal-type molecular weight distribution.

16 Claims, No Drawings

CONJUGATED DIOLEFIN COPOLYMER RUBBER AND RUBBER COMPOSITION

BACKGROUND OF THE INVENTION

1. Field of the Invention

The present invention relates to a conjugated diolefin copolymer rubber and a rubber composition. More particularly, the present invention relates to a conjugated diolefin copolymer rubber which exhibits superior processability (such as easiness in mixing by a mixer such as Banbury, easiness in winding the sheets made from the rubber composition by a roller mill, excellent smoothness of the surface of the sheets, tidy edge of the sheets, etc.) and which can produce vulcanized products exhibiting well-balanced improved properties such as wet skid properties, low hysteresis loss properties, abrasion resistance, breaking strength, and superior processability, irrespective of the types and combinations of fillers to be added, and is useful as a tread material for low fuel consumption tires, large tires, and high performance tires.

2. Description of the Background Art

Development of a conjugated diolefin-type rubber material for use in tires exhibiting reduced rolling resistance, high abrasion resistance, excellent breaking strength, as well as superior operational stability performance typified by superior wet skid properties is desired to respond to recent demand for vehicles with a low fuel consumption.

Rolling resistance can generally be reduced by decreasing the hysteresis loss of vulcanized rubber. Impact resilience at 50–80° C., tan $\delta$ at 50–80° C., and small Goodrich heat generation, and the like are used as an index of evaluation of the hysteresis loss of vulcanized rubber materials. Specifically, rubber materials with a large impact resilience at 50–80° C., a small tan $\delta$ at 50–80° C., and a small Goodrich heat generation are preferable.

Natural rubbers, polyisoprene rubber, or polybutadiene rubber, and so on are known as rubber materials with low hysteresis loss. A problem with these rubber materials is their poor wet skid resistance.

As a method for decreasing the hysteresis loss without impairing wet skid resistance in the polymerization of styrene-butadiene copolymers of various structures using an organic alkali metal initiator in a hydrocarbon solvent, various methods for modifying the polymer terminals by introducing functional groups have been proposed. Examples of such polymers include styrene-butadiene copolymers obtained by modifying or coupling the polymer terminals with a tin compound (Japanese Patent Application Laid-open No. 55912/1982), styrene-butadiene copolymers obtained by modifying the polymer terminals with an isocyanate compound (Japanese Patent Application Laid-open No. 141741/1986) or a lactam compound (Japanese Patent Application Laid-open No. 43402/1986), and the like.

The polymers thus obtained by modifying the terminals are made into rubber compositions by incorporating carbon black as a reinforcing agent and vulcanized, to produce vulcanized rubber which exhibits a decreased hysteresis loss, superior abrasion resistance, and excellent failure characteristics, without impairing wet skid resistance. More recently, tires made from a rubber composition containing silica which can improve both rolling resistance and wet skid resistance are accepting wider popularity. Because a rubber composition containing silica has a problem of inferior processability and electrical resistance, rubber compositions containing a mixture of silica and carbon black are usually used.

However, such a silica-containing rubber composition has a problem that the vulcanized products exhibit low tensile strength and abrasion resistance. Moreover, a silica-containing composition exhibits inferior processability as compared with a carbon black-containing composition, resulting in an increased processing cost.

Various silica-containing rubber compositions comprising polymers in which functional groups exhibiting affinity with silica are introduced to the terminals have been proposed to improve tensile strength and abrasion resistance of vulcanized products made from the silica-containing composition (such polymers may be hereinafter called "modified polymers"). For example, Japanese Patent Publication No. 36957/1974 discloses a method of preparing polymers by reacting silicon tetrahalide, or trihalosilane, or the like; Japanese Patent Publication No.5071/1977 discloses a method of producing polymers modified with a halogenated silane compound; Japanese Patent Application Laid-open No.188501/1989 discloses diene-type rubber in which a halogenated silyl group is introduced; and Japanese Patent Application Laid-open No. 230286/1997 discloses diene-type rubber in which an alkyl silyl group is introduced.

Although the properties of silica-containing rubber compositions disclosed by these patents have been improved to some extent by the use of modified polymers, tensile strength and abrasion resistance of vulcanized rubbers made from such rubber compositions are not necessarily satisfied. Moreover, the effect of lowering a hysteresis loss was not necessarily satisfactory in the composition using a mixture of silica and carbon black, particularly when the proportion of carbon black is increased. As mentioned above, a silica-containing composition exhibits inferior processability as compared with a carbon black-containing composition. This tendency is conspicuous when the modified polymer is used.

Conventional modified polymers used for silica-containing compositions are broadly grouped into those suitable for use with carbon black and those suitable for use with silica. The necessity for selecting optimum combinations of the types of filler as reinforcing agents and rubber copolymers in accordance with the application of the ultimate rubber product posed a problem associated with complicated and difficult tasks in the manufacture of the rubber product, because if one of the components is altered, the other component must also be altered. Moreover, when a mixture of silica and carbon black is used, the effect of the reinforcing agent varies according to the proportion of silica and carbon black, irrespective of the types of modified polymers. Deciding the proportion according to the application of the product was also a difficult and complicated task.

To overcome such complexity and difficulty, polymers in which amino groups are introduced have been proposed as effective modified polymers for use with silica or carbon black. Examples of such polymers for use with carbon black include (1) polymers obtained by introducing an amino group at the initial chain end of the polymer using a lithium amide initiator (Japanese Patent Application Laid-open No.38209/1984, Japanese Patent Publication No. 1298/1993, Japanese Patent Application Laid-open No. 279515/1994, Japanese Patent Application Laid-open No. 199923/1994, and Japanese Patent Application Laid-open No. 53616/1995) and (2) various styrene-butadiene copolymers of different structures polymerized using an organolithium initiator, of which the terminals are modified with a nitrogen-containing compound such as a urea compound (Japanese Patent Application Laid-open No. 27338/1986) or a dialkylamino benzophenone compound (Japanese Patent Applications Laid-open No. 162604/1983 and No. 189203/1983).

As the modified polymers used with silica, diene-type rubbers with an alkyl silyl group introduced therein have been proposed (Japanese Patent Applications Laid-open No. 101344/1989, No. 22940/1989, and No. 71687/1997).

A certain degree of improvement in the properties has been achieved by the modified polymers disclosed by these patent applications in both the compositions containing silica and the compositions containing carbon black.

However, disclosure in these patent applications relates to the methods for introducing amino groups into polymers for the most part and there are no specific descriptions on the relationship between the structure of the modified polymers and various properties. The disclosure in these patent applications thus was not necessarily satisfactory.

The present invention has been completed in view of this situation. Specifically, an object of the present invention is to provide a conjugated diolefin copolymer rubber and a composition comprising such a rubber, which exhibits superior processability and can produce vulcanized products exhibiting well-balanced improved properties such as wet skid properties, low hysteresis loss properties, abrasion resistance, breaking strength, and superior processability, and is useful as a tread material for low fuel consumption tires, large tires, and high performance tires, irrespective of the types and combinations of fillers (reinforcing agents) used, that is, in the case where either carbon black or silica, or both, is used or in the case where a carbon-silica dual-phase-filler is used.

SUMMARY OF THE INVENTION

Specifically, the present invention provides the following conjugated diolefin copolymer rubbers and rubber compositions.

[1] A conjugated diolefin copolymer rubber, prepared by the copolymerization of a conjugated diolefin and a vinyl aromatic compound, the conjugated diolefin copolymer rubber (1) having a content of the bonded vinyl aromatic compound of 5–50 wt %, (2) containing 0.01–5.0 mmol of an alkoxysilyl group having substantially non-hydrolyzable Si—O—R bond (wherein R indicates a hydrocarbon group having 4–20 carbon atoms) and 0.01–2.0 mmol of a tin-carbon bond for 100 g of the copolymer rubber, and (3) having a poly-modal type molecular weight distribution.

[2] A conjugated diolefin copolymer rubber, prepared by the copolymerization of a conjugated diolefin and a vinyl aromatic compound, the conjugated diolefin copolymer rubber (1) having a content of the bonded vinyl aromatic compound of 5–50 wt %, (2') containing 0.01–5.0 mmol of an alkoxysilyl group having substantially non-hydrolyzable Si—O—R bond (wherein R indicates a hydrocarbon group having 4–20 carbon atoms), 0.01–2.0 mmol of a tin-carbon bond, and 0.01–1.5 mmol of an amino group, for 100 g of the copolymer rubber, and (3) having a poly-modal type molecular weight distribution.

[3] The conjugated diolefin copolymer rubber described in [1] above, which is a mixture of a conjugated diolefin copolymer rubber containing an alkoxysilyl group having substantially non-hydrolyzable Si—O—R bond (wherein R indicates a hydrocarbon group having 4–20 carbon atoms) and a conjugated diolefin copolymer rubber containing a tin-carbon bond.

[4] The conjugated diolefin copolymer rubber described in [2] above, which is a mixture of a conjugated diolefin copolymer rubber containing an amino group and an alkoxysilyl group having substantially non-hydrolyzable Si—O—R bond (wherein R indicates a hydrocarbon group having 4–20 carbon atoms) and a conjugated diolefin copolymer rubber containing an amino group and a tin-carbon bond.

[5] A rubber composition comprising 100 parts by weight of the conjugated diolefin copolymer rubber described in any one of [1] to [4] above and 5–60 parts by weight of an extensible oil with a viscosity specific gravity constant (V.G.C.) of 0.800–0.950.

[6] A rubber composition comprising the conjugated diolefin copolymer rubber described in any one of [1] to [4] above in an amount of 30 wt % or more of the total amount of rubber components, and carbon black or silica, or both carbon black and silica in an amount of 2–100 parts by weight or 30–100 parts by weight for 100 parts by weight, respectively, of the total amount of rubber components and, when silica is contained, a silane coupling agent in an amount of 1–20 parts by weight for 100 parts by weight of silica.

[7] A rubber composition comprising, the conjugated diolefin copolymer rubber of any one of [1] to [4] above in an amount of 30 parts by weight or more of the total amount of rubber components and (a) a total of 30–100 parts by weight of carbon black and silica for 100 parts by weight of the total amount of rubber components, (b) 30–100 parts by weight of carbon-silica dual-phase-fillers for 100 parts by weight of the total amount of rubber components, or (c) a total of 30–100 parts by weight of carbon-silica dual-phase-fillers and carbon black and/or silica for 100 parts by weight of the total amount of rubber components, and a silane coupling agent in an amount of 1–20 parts by weight for 100 parts by weight of the carbon-silica dual-phase-fillers and carbon black and/or silica.

In addition to the above copolymer rubbers and rubber compositions, the following rubber compositions are provided by the present invention.

[8] A rubber composition comprising 100 parts by weight of the conjugated diolefin copolymer rubber described in [1] above, 5–60 parts by weight of an extensible oil with a viscosity specific gravity constant (V.G.C.) of 0.800–0.950, 2–100 parts by weight of carbon black and/or 30–100 parts by weight of silica for 100 parts by weight of the total amount of rubber components and, when silica is contained, a silane coupling agent in an amount of 1–20 parts by weight for 100 parts by weight of silica, wherein the content of the conjugated diolefin copolymer rubber described in [1] above in the rubber composition is 30 wt % or more of the total amount of rubber components.

[9] A rubber composition comprising 100 parts by weight of the conjugated diolefin copolymer rubber described in [2] above, 5–60 parts by weight of an extensible oil with a viscosity specific gravity constant (V.G.C.) of 0.800–0.950, 2–100 parts by weight of carbon black and/or 30–100 parts by weight of silica for 100 parts by weight of the total amount of rubber components and, when silica is contained, a silane coupling agent in an amount of 1–20 parts by weight for 100 parts by weight of silica, wherein the content of the conjugated diolefin copolymer rubber described in [2] above in the rubber composition is 30 wt % or more of the total amount of rubber components.

[10] A rubber composition comprising 100 parts by weight of the conjugated diolefin copolymer rubber described in [3] above, 5–60 parts by weight of an extensible oil with a viscosity specific gravity constant (V.G.C.) of 0.800–0.950, 2–100 parts by weight of carbon black and/or 30–100 parts by weight of silica for 100 parts by weight of the total amount of rubber components and, when silica is contained, a silane coupling agent in an amount of 1–20 parts by weight for 100 parts by weight of silica, wherein the content of the conjugated diolefin copolymer rubber described in [3] above in the rubber composition is 30 wt % or more of the total amount of rubber components.

[11] A rubber composition comprising 100 parts by weight of the conjugated diolefin copolymer rubber described in [4] above, 5–60 parts by weight of an extensible oil with a viscosity specific gravity constant (V.G.C.) of 0.800–0.950, 2–100 parts by weight of carbon black and/or 30–100 parts by weight of silica for 100 parts by weight of the total amount of rubber components and, when silica is contained, a silane coupling agent in an amount of 1–20 parts by weight for 100 parts by weight of silica, wherein the content of the conjugated diolefin copolymer rubber described in [4] above in the rubber composition is 30 wt % or more of the total amount of rubber components.

[12] A rubber composition comprising 100 parts by weight of the conjugated diolefin copolymer rubber described in [1] above, 5–60 parts by weight of an extensible oil with a viscosity specific gravity constant (V.G.C.) of 0.800–0.950, and (a) a total of 30–100 parts by weight of carbon black and silica for 100 parts by weight of the total amount of rubber components, (b) 30–100 parts by weight of carbon-silica dual-phase-fillers for 100 parts by weight of the total amount of rubber components, or (c) a total of 30–100 parts by weight of carbon-silica dual-phase-fillers and carbon black and/or silica for 100 parts by weight of the total amount of rubber components, and a silane coupling agent in an amount of 1–20 parts by weight for 100 parts by weight of the carbon-silica dual-phase-fillers and carbon black and/or silica, wherein the content of the conjugated diolefin copolymer rubber described in [1] above in the rubber composition is 30 wt % or more of the total amount of rubber components.

[13] A rubber composition comprising 100 parts by weight of the conjugated diolefin copolymer rubber described in [2] above, 5–60 parts by weight of an extensible oil with a viscosity specific gravity constant (V.G.C.) of 0.800–0.950, and (a) a total of 30–100 parts by weight of carbon black and silica for 100 parts by weight of the total amount of rubber components, (b) 30–100 parts by weight of carbon-silica dual-phase-fillers for 100 parts by weight of the total amount of rubber components, or (c) a total of 30–100 parts by weight of carbon-silica dual-phase-fillers and carbon black and/or silica for 100 parts by weight of the total amount of rubber components, and a silane coupling agent in an amount of 1–20 parts by weight for 100 parts by weight of the carbon-silica dual-phase-fillers and carbon black and/or silica, wherein the content of the conjugated diolefin copolymer rubber described in [2] above in the rubber composition is 30 wt % or more of the total amount of rubber components.

[14] A rubber composition comprising 100 parts by weight of the conjugated diolefin copolymer rubber described in [3] above, 5–60 parts by weight of an extensible oil with a viscosity specific gravity constant (V.G.C.) of 0.800–0.950, and (a) a total of 30–100 parts by weight of carbon black and silica for 100 parts by weight of the total amount of rubber components, (b) 30–100 parts by weight of carbon-silica dual-phase-fillers for 100 parts by weight of the total amount of rubber components, or (c) a total of 30–100 parts by weight of carbon-silica dual-phase-fillers and carbon black and/or silica for 100 parts by weight of the total amount of rubber components, and a silane coupling agent in an amount of 1–20 parts by weight for 100 parts by weight of the carbon-silica dual-phase-fillers and carbon black and/or silica, wherein the content of the conjugated diolefin copolymer rubber described in [3] above in the rubber composition is 30 wt % or more of the total amount of rubber components.

[15] A rubber composition comprising 100 parts by weight of the conjugated diolefin copolymer rubber described in [4] above, 5–60 parts by weight of an extensible oil with a viscosity specific gravity constant (V.G.C.) of 0.800–0.950, and (a) a total of 30–100 parts by weight of carbon black and silica for 100 parts by weight of the total amount of rubber components, (b) 30–100 parts by weight of carbon-silica dual-phase-fillers for 100 parts by weight of the total amount of rubber components, or (c) a total of 30–100 parts by weight of carbon-silica dual-phase-fillers and carbon black and/or silica for 100 parts by weight of the total amount of rubber components, and a silane coupling agent in an amount of 1–20 parts by weight for 100 parts by weight of the carbon-silica dual-phase-fillers and carbon black and/or silica, wherein the content of the conjugated diolefin copolymer rubber described in [4] above in the rubber composition is 30 wt % or more of the total amount of rubber components.

[16] The rubber composition described in any one of [5] to [15] above, which further comprises at least one rubber component selected from the group consisting of conjugated diolefin-vinyl aromatic compound copolymer rubbers other than that defined in [1] to [4] above, cis-1,4-polyisoprene rubber, natural rubber, 3,4-polyisoprene rubber, styrene/butadiene copolymer rubber, styrene/isoprene/butadiene copolymer rubber, cis-1,4-butadiene rubber, trans-1,4-butadiene rubber, and low to high vinyl butadiene rubbers (having a vinyl content of 10–90%), acrylonitrile/butadiene copolymer rubber, and polychloroprene rubber.

Other objects, features and advantages of the invention will hereinafter become more readily apparent from the following description.

DETAILED DESCRIPTION OF THE INVENTION AND PREFERRED EMBODIMENTS

The present invention will now described in more detail by way of embodiments.

I. Conjugated Diolefin Copolymer Rubber

The conjugated diolefin copolymer rubber of the present invention is prepared by the copolymerization of a conjugated diolefin and a vinyl aromatic compound, and (1) has a content of the bonded vinyl aromatic compound of 5–50 wt %, (2) contains 0.01–5.0 mmol of an alkoxysilyl group having substantially non-hydrolyzable Si—O—R bond (wherein R indicates a hydrocarbon group having 4–20 carbon atoms) and 0.01–2.0 mmol of a tin-carbon bond for 100 g of the copolymer rubber, and (3) has a poly-modal type molecular weight distribution (this conjugated diolefin copolymer rubber may be called "first copolymer rubber").

Further, the conjugated diolefin copolymer rubber may be prepared by the copolymerization of a conjugated diolefin and a vinyl aromatic compound, which (1) may have a content of the bonded vinyl aromatic compound of 5–50 wt %, (2') contain 0.01–5.0 mmol of an alkoxysilyl group having substantially non-hydrolyzable Si—O—R bond (wherein R indicates a hydrocarbon group having 4–20 carbon atoms), 0.01–2.0 mmol of a tin-carbon bond, and 0.01–1.5 mmol of an amino group, for 100 g of the copolymer rubber, and (3) have a poly-modal type molecular weight distribution (this conjugated diolefin copolymer rubber may be called "second copolymer rubber").

The first copolymer rubber and the second copolymer rubber may be called collectively "copolymer rubber of the present invention" in the description below.

One of the features of the present invention is that the copolymer rubber contains, as mentioned above, a modified rubbery polymer having substantially non-hydrolyzable Si—O—R bond (wherein R indicates a hydrocarbon group having 4–20 carbon atoms). Here, "substantially non-hydrolyzable" means characteristics of a rubber which does not exhibit an increase in Mooney viscosity ($ML_{1+4}$, 100° C.) of more than 10 points, and preferably more than 5 points, when 60 g of a rubber sheet, formed using a heat roll at 120° C. at a roll space of 0.5 mm, is placed in a container made of stainless steel which is filled with hot water, allowed to be heated in the container while boiling the water by injecting steam for 30 minutes, and dried.

"The alkoxysilyl group having substantially non-hydrolyzable Si—O—R bond (wherein R indicates a hydrocarbon group having 4–20 carbon atoms)" may be called "non-hydrolyzable alkoxysilyl group" in the present invention.

If the alkoxysilyl group contained in the copolymer rubber has a hydrolyzable Si—O—R' bond (wherein R' indicates a hydrocarbon group having 1–3 carbon atoms), hydrolysis and condensation reactions tend to occur easily and the resulting products are insoluble in organic solvents. This induces a fatal problem such as inapplicability of steam coagulation when solvent is removed in the manufacturing process.

In addition, because such a hydrolyzable Si—O—R' bond (wherein R' indicates a hydrocarbon group having 1–3 carbon atoms) easily causes hydrolysis and condensation reactions, may functional groups having affinity with silica may have been disappeared at the time of manufacture, storage, or blending to produce vulcanized products. Therefore, it is difficult to obtain products with sufficiently high tensile strength, even if the vulcanized products contain silica.

Methoxysilyl group, ethoxysilyl group, and the like can be given as examples of hydrolyzable Si—O—R' bond (wherein R' indicates a hydrocarbon group having 1–3 carbon atoms).

The first copolymer rubber contains non-hydrolyzable alkoxysilyl groups and tin-carbon bonds in the polymer chain which is obtained by the copolymerization of a conjugated diolefin and a vinyl aromatic compound. This increases the interaction of the copolymer rubber with reinforcing agents (fillers) such as carbon black, silica, and silica dual-phase-fillers used in rubber compositions, which result in vulcanized rubbers with improved low hysteresis loss properties and wet skid resistance, while maintaining superior abrasion resistance.

The second copolymer rubber contains non-hydrolyzable alkoxysilyl groups, tin-carbon bonds, and amino groups in the polymer chain which is obtained by the copolymerization of a conjugated diolefin and a vinylaromatic compound. The second copolymer rubber satisfying this requirement exhibits a strong interaction with a reinforcing agent (filler), when a rubber composition is prepared by the addition of the reinforcing agent (filler), thereby ensuring remarkable improvement.

In the first copolymer rubber, it is not essential for all polymer chains obtained by the copolymerization of a conjugated diolefin and a vinyl aromatic compound to contain non-hydrolyzable alkoxysilyl groups and tin-carbon bonds, but it is sufficient that the non-hydrolyzable alkoxysilyl groups and tin-carbon bonds are contained in the resulting polymer as a whole.

Specifically, the first copolymer rubber may contain non-hydrolyzable alkoxysilyl groups and tin-carbon bonds in either the following manner (A) or (B).

(A) Non-hydrolyzable alkoxysilyl groups and tin-carbon bonds are present in substantially all polymer chains.

(B) There are combinations of at least two types polymer chains selected from the group consisting of the following (i)–(iv), provided that non-hydrolyzable alkoxysilyl groups and tin-carbon bonds must be present in the polymer as a whole.

(i) Polymer chains containing both the non-hydrolyzable alkoxysilyl groups and tin-carbon bonds.

(iv) Polymer chains containing only the non-hydrolyzable alkoxysilyl groups.

(iii) Polymer chains containing only tin-carbon bonds.

(iv) Polymer chains containing neither the non-hydrolyzable alkoxysilyl groups nor tin-carbon bonds.

Of the above the first copolymer rubbers, a mixture of a conjugated diolefin copolymer rubber containing a non-hydrolyzable alkoxysilyl group and a conjugated diolefin copolymer rubber containing a tin-carbon bond is preferable.

The second copolymer rubber contains amino groups in addition to non-hydrolyzable alkoxysilyl groups and tin-carbon bonds. In the same way as in the case of the first copolymer rubber, it is not essential for all polymer chains to contain non-hydrolyzable alkoxysilyl groups, tin-carbon bonds, and amino groups, but it is sufficient that the non-hydrolyzable alkoxysilyl groups, tin-carbon bonds, and amino groups are contained in the polymer as a whole.

Specifically, the second copolymer rubber may contain non-hydrolyzable alkoxysilyl groups and tin-carbon bonds in either the following manner (A) or (B).

(A) Non-hydrolyzable alkoxysilyl groups, tin-carbon bonds, and amino groups are present in substantially all polymer chains.

(B) There are combinations of at least two types polymer chains selected from the group consisting of the following (i)–(vii), provided that non-hydrolyzable alkoxysilyl groups, tin-carbon bonds, and amino groups must be present in the polymer as a whole.

(i) Polymer chains containing non-hydrolyzable alkoxysilyl groups and tin-carbon bonds.
(ii) Polymer chains containing only the non-hydrolyzable alkoxysilyl groups and amino groups.
(iii) Polymer chains containing tin-carbon bonds and amino groups.
(iv) Polymer chains containing only the non-hydrolyzable alkoxysilyl groups.
(v) Polymer chains containing only tin-carbon bonds.
(vi) Polymer chains containing only amino groups.
(vii) Polymer chains containing none of the non-hydrolyzable alkoxysilyl groups, tin-carbon bonds, and amino groups.

Of the above the second copolymer rubbers, a mixture of a conjugated diolefin copolymer rubber containing an amino group and a non-hydrolyzable alkoxysilyl group and a conjugated diolefin copolymer rubber containing an amino group and a tin-carbon bond is preferable.

The copolymer rubber containing two or more different polymer chains can be prepared by producing different polymer chains in different polymerization reactors and mixing the resulting polymer solutions, by producing such different polymer chains in a single polymerization reactor either successively or simultaneously, or by melt-mixing of different polymer chains.

The polystyrene-reduced weight average molecular weight of the copolymer rubber of the present invention measured by the gel permeation chromatography (GPC) method is preferably in the range from 100,000 to 500,000, and more preferably from 150,000 to 400,000.

The molecular weight distribution (Mw/Mn) is from 1.1 to 2.5, and preferably from 1.2 to 2.0.

Another feature of the copolymer of the present invention is that the molecular weight measured by GPC exhibits a poly-modal type distribution.

A polymer having a narrow (e.g. less than 2.0 Mw/Mn) mono-modal type molecular weight distribution exhibits a high viscosity when blended with other components, resulting in impaired processability. The poor processability not only increases the cost, but also impairs blending characteristics of components, such as insufficient dispersion of reinforcing agents and other additives, which results in worsening of properties. If the molecular weight of the rubber is decreased to reduce the viscosity of the composition, not only low hysteresis loss properties are impaired, but also tackiness of the rubber increases, resulting in uneasiness in handling, large cold flow, and poor storage stability.

A polymer having a broad (e.g. 2.0 or more Mw/Mn) mono-modal type molecular weight distribution contains an increased amount of low molecular weight components, which gives rise to low hysteresis loss properties and poor abrasion resistance. In addition, the composition containing such a polymer exhibits poor fluidity when extruded and produces extruded products with large shrinkage, giving rise to inadequate processability.

There are no specific limitations to the method for preparing the polymer of the present invention with a poly-modal type molecular weight distribution measured by GPC. The following methods can be given as examples.

Method 1

After copolymerization of a conjugated diolefin and a vinyl aromatic compound, when the polymerization conversion rate reaches 90–100%, a coupling agent such as a specific alkoxysilyl group-containing compound having a substantially non-hydrolyzable Si—O—R bond (wherein R indicates a hydrocarbon group having 4–20 carbon atoms) or a tin compound is added. The coupling agent is reacted with active terminals of part of this polymer, thereby increasing the molecular weight of the copolymer. The molecular weight distribution may be made poly-modal by adjusting the amount of the coupling agents added and thereby controlling the proportion of the polymer of which the molecular weight is increased and the polymer which does not react with the coupling agents.

Method 2

A reagent which inactivates part of active polymer terminals (a polymerization termination agent) is added during the copolymerization of a conjugated diolefin and a vinyl aromatic compound, when polymerization conversion rate is less than 50%. Because polymer terminals which have not been inactivated polymerize with the remaining monomers, the resulting polymer has a larger molecular weight than the inactivated polymer, whereby the molecular weight distribution becomes poly-modal type.

Among these methods, the method (1) in which a coupling agent is added is preferable in view of polymer properties and productivity.

Mooney viscosity ($ML_{1+4}$, 100) of the copolymer rubber of the present invention is preferably from 20 to 200, more preferably from 30 to 150, and particularly preferably from 50 to 130.

Each components for the composition will now be described in more detail.

1. Conjugated Diolefin

The conjugated diolefins used in the present invention include, but are not limited to, 1,3-butadiene, isoprene, 2,3-dimethyl-1,3-butadiene, 2-chloro-1,3-butadiene, 1,3-pentadiene, and mixtures of these.

The content of 1,2-bond and/or 3,4-bond (hereinafter called "vinyl bonds") of the conjugated diolefin part is preferably from 20 to 80%, and particularly preferably from 25 to 75% of the total unsaturated bonds. If the vinyl bond content is less than 20 wt %, the resulting product may have inferior wet skid resistance and poor handling stability. If more than 80%, abrasion resistance may be impaired.

2. Aromatic Vinyl Compound

The aromatic vinyl compounds used in the copolymer rubber of the present invention include, but are not limited to, styrene, 2-methylstyrene, 3-methylstyrene, 4-methylstyrene, α-methylstyrene, 2,4-dimethylstyrene, 2,4-diisopropylstyrene, 4-tert-butylstyrene, divinylbenzene, vinyl benzyl dimethylamine, (4-vinylbenzyl)dimethyl aminoethyl ether, N,N-dimethylaminoethyl styrene, tert-butoxystyrene, vinylpyridine, and mixtures of these. Of these, styrene is preferable.

The amount of aromatic vinyl compounds bonded to the polymer chain is preferably from 5 to 50 wt %, and more preferably from 10 to 45 wt %. If the amount of the bonded aromatic vinyl compounds is less than 5 wt %, wet skid resistance may be impaired. If more than 50 wt %, hysteresis loss may increase.

3. Non-hydrolyzable Alkoxysilyl Groups, Tin-carbon Bonds, and Amino Groups

There is no specific restriction to the structure of the polymer chains which may be contained in the copolymer rubber of the present invention. For example, the structures shown by the following formulas (1)–(5) can be given.

The following formula (1) shows the structure having a tin-carbon bond on one of the terminals of the polymer chain and a non-hydrolyzable alkoxysilyl group on the other terminal.

The following formula (2) shows the structure having a tin-carbon bond on one of the terminals of the polymer chain and having neither non-hydrolyzable alkoxysilyl group nor amino group on the other terminal.

The following formula (3) shows the structure having a non-hydrolyzable alkoxysilyl group on one of the terminals of the polymer chain and having neither tin-carbon bond nor amino group on the other terminal.

The following formula (4) shows the structure having a tin-carbon bond on one of the terminals of the polymer chain and an amino group on the other terminal.

The following formula (5) shows the structure having a non-hydrolyzable alkoxysilyl group on one of the terminals of the polymer chain and an amino group on the other terminal.

The non-hydrolyzable alkoxysilyl group, tin-carbon bond, and amino group are usually present on the terminals of polymer chain, but these may also be present on side chains.

The portion shown by the wavy line in the following formulas (1)–(5) indicates shows a polymer chain of a conjugated diolefin and an aromatic vinyl compound.

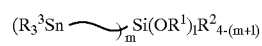
(1)

wherein $R^1$ is a hydrocarbon group having 4–20 carbon atoms (e.g. an alkyl group, aryl group, etc.), that is, $OR^1$ represents a non-hydrolyzable alkoxy group or the like having 4–20 carbon atoms, $R^2$ and $R^3$ individually represent an alkyl group, aryl group, vinyl group, or alkyl halide group having 1–20 carbon atoms, m is an integer of 1–3, and l is an integer of 1–3, provided that m+l is 2–4. Specifically, the silane compound used in the present invention is an alkoxysilane compound or the like having a non-hydrolyzable alkoxy group, and as $R^1$, a hydrocarbon group with 3 carbon atoms bonded to the α-position carbon atom, a hydrocarbon group with at least one carbon atom bonded to the β-position carbon atom, or an aromatic hydrocarbon group shown by a phenyl group or tolyl group is preferable.

(2)

$R^4$ in the above formula (2) represents a hydrocarbon group, preferably a hydrocarbon group having 1–20 carbon atoms. $R^5$ represents an inert group not containing an alkoxysilyl group and amino group, and preferably is a hydrocarbon group having 1–20 carbon atoms. m, which represents the number of copolymer chains, is an integer from 1–3.

As examples of the hydrocarbon group represented by $R^4$, alkyl groups, aryl groups, aralkyl groups, and the like can be given.

As examples of the hydrocarbon group represented by $R^5$, alkyl groups, aryl groups, and the like can be given.

(3)

wherein $R^6$ is a hydrocarbon group having 4–20 carbon atoms (e.g. an alkyl group, aryl group, etc.), that is, $OR^6$ represents a non-hydrolyzable alkoxy group or the like having 4–20 carbon atoms, and m, which represents the number of copolymer chains, is an integer of 1–3. Specifically, the silane compound used in the present invention is an alkoxysilane compound or the like having a non-hydrolyzable alkoxy group, and as $R^6$, a hydrocarbon group with 3 carbon atoms bonded to the α-position carbon atom, a hydrocarbon group with at least one carbon atom bonded to the β-position carbon atom, or an aromatic hydrocarbon group shown by a phenyl group or tolyl group is preferable. $R^7$ represents a group not containing a tin-carbon bond and amino group, and preferably is a hydrocarbon group having 1–20 carbon atoms.

As examples of the hydrocarbon group represented by $R^7$, alkyl groups, aryl groups, aralkyl groups, and the like can be given.

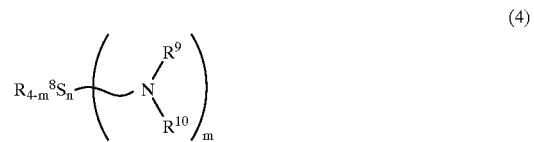
(4)

$R^8$ in the above formula (4) represents a hydrocarbon group, preferably a hydrocarbon group having 1–20 carbon atoms. wherein $R^9$ and $R^{10}$ individually represent a hydrocarbon group, preferably a hydrocarbon group having 1–20 carbon atoms, and m, which is the number of copolymer chains, represents an integer from 1–3.

As examples of the hydrocarbon group represented by $R^8$, alkyl groups, aryl groups, aralkyl groups, and the like can be given.

As examples of the hydrocarbon group represented by $R^9$ or $R^{10}$, alkyl groups, aryl groups, and the like can be given.

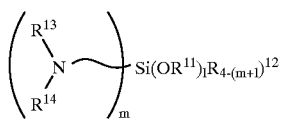

(5)

wherein $R^{11}$ is a hydrocarbon group having 4–20 carbon atoms (e.g. an alkyl group, aryl group, etc.), that is, $OR^{11}$ represents a non-hydrolyzable alkoxy group or the like having 4–20 carbon atoms. Specifically, the silane compound used in the present invention is an alkoxysilane compound or the like having a non-hydrolyzable alkoxy group, and as $R^{11}$, a hydrocarbon group with 3 carbon atoms bonded to the α-position carbon atom, a hydrocarbon group with at least one carbon atom bonded to the β-position carbon atom, or an aromatic hydrocarbon group shown by a phenyl group or tolyl group is preferable; $R^{12}$, $R^{13}$, and $R^{14}$ individually represent a hydrocarbon group, preferably a hydrocarbon group having 1–20 carbon atoms; m, which represents the number of copolymer chains, is an integer from 1–3; and l is an integer from 1–3; provided that (m+l) is an integer of 2–4.

As examples of the hydrocarbon group represented by $R^{12}$, $R^{13}$, and $R^{14}$, alkyl groups, aryl groups, aralkyl groups, and the like can be given.

Specific structures of the compounds shown by the above formulas (1)–(5) are as follows.

In the structural formulas shown below, the formula denoted by (2-1), for example, indicates that that structure belongs to the structure (2).

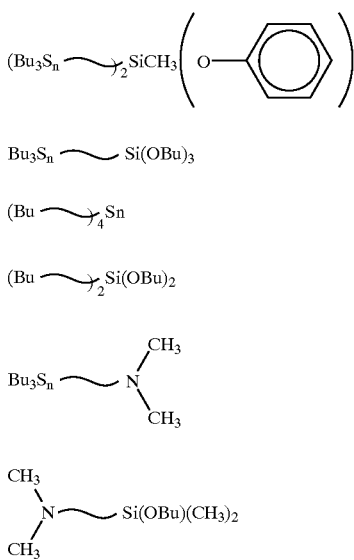

The content of non-hydrolyzable alkoxysilyl group groups in the copolymer rubber (the first and second copolymer rubbers) of the present invention is usually from 0.01 to 5 mmol, preferably from 0.1 to 4 mmol, for 100 g of the copolymer rubber.

The content of tin-carbon bonds in the copolymer rubber (first and second copolymer rubbers) of the present invention is usually from 0.01 to 2 mmol, preferably from 0.02 to 1 mmol, for 100 g of the copolymer rubber.

The content of amino groups in the second copolymer rubber of the present invention is usually from 0.01 to 1.5 mmol, preferably from 0.05 to 1 mmol, for 100 g of the copolymer rubber.

4. Method for Manufacturing the Copolymer Rubber

Although there are no specific limitations to the method for manufacturing the copolymer rubbers of the present invention, an anion living polymerization method can be given as a preferable example. It is desirable to select a suitable anionic polymerization initiator (for example, an organic alkali metal compound) and modification agent which reacts with anionic reactive terminals (for example, a coupling agent) in the anion living polymerization method.

Here, Li, Na, K, Rb, and Sc can be given as the alkali metal which form an organic alkali metal compound. Of these alkali metals, Li is desirable.

It is possible to prepare an oil extended rubber by adding extensible oil to the polymer before or after completion of the polymerization.

(1) Method for Preparing Copolymer Rubber of the Formula (1)

In the preparation of the copolymer rubber shown by the above formula (1), an organic alkali metal compound, for example, $R^{15}{}_3SnLi$ (wherein $R^{15}$ represents an alkyl group having 1–20 carbon atoms or a cycloalkyl group having 3–20 carbon atoms), preferably tributyl tin lithium, is used as an anionic polymerization initiator, and an alkoxysilane shown by the following formula (a) or (b) is used as a modification agent.

$$X_q Si(OR^{16})_p R^{17}{}_{4-(p+q)} \quad (a)$$

$$(X_i Si(OR^{18})_h)\text{—}(S)_j\text{—}(X_i Si(OR^{19})_h) \quad (b)$$

In the above formulas (a) and (b), X is a halogen atom, preferably Cl, Br, or I, $R^{16}$, $R^{18}$, and $R^{19}$ are hydrocarbon groups having 4–20 carbon atoms, (e.g. an alkyl group, aryl group, etc.), that is, $OR^{16}$, $OR^{18}$, and $OR^{19}$ represent an alkoxy group having 4–20 carbon atoms or the like. Specifically, the silane compound used in the present invention is an alkoxysilane compound or the like having a non-hydrolyzable alkoxy group, and as $R^{16}$, $R^{18}$, and $R^{19}$, a hydrocarbon group with 3 carbon atoms bonded to the α-position carbon atom, a hydrocarbon group with at least one carbon atom bonded to the β-position carbon atom, or an aromatic hydrocarbon group shown by a phenyl group or tolyl group is preferable. $R^{17}$ represents an alkyl group, aryl group, alkyl halide group, or the like. p is an integer of 1–4 and q, an integer of 0–2 (provided that p+q is an integer of 2–4), i is an integer of 0–2, j is an integer of 1–8, h is an integer of 1–3 (provided i+h is 3), and n is an integer of 0–10.

As examples of $R^{17}$, alkyl groups such as methyl group, ethyl group, n-propyl group, and t-butyl group; aryl groups such as phenyl group, tolyl group, naphthyl group; and alkyl halide groups such as chloromethyl group, bromomethyl group, iodinemethyl group, and chloroethyl group can be given.

In the above formulas (a) and (b), the compound with q=0 and p=2 is a dialkyl dialkoxysilane, the compound with q=0 and p=3 is a monoalkyl trialkoxysilane, the compound with q=0 and p=4 is a tetraalkoxysilane, the compound with q=1 and p=1 is a monohalogenodialkyl monoalkoxysilane, the compound with q=1 and p=2 is a monohalomonoalkyl dialkoxysilane, the compound with q=1 and p=3 is a monohalogenotrialkoxysilane, the compound with q=2 and p=1 is a dihalogenomonoalkyl monoalkoxysilane, and the compound with q=2 and p=2 is dihalogenodialkoxysilane. All these compounds exhibit reactivity with active terminals of living polymers. A monoalkyl trialkoxysilane (q=0, p=3), tetraalkoxysilane (q=0, p=4), and monohalomonoalkyl dialkoxysilane (q=1, p=2) are preferable because of their capability of improving processability by coupling living polymers and also of providing polymers with functional groups having high affinity with silica or the like.

Given as specific examples of silane compounds of the above formula (a) which are preferably used in the present invention are tetrakis(2-ethylhexyloxy)silane, tetraphenoxysilane, methyltris(2-ethylhexyloxy)silane, ethyltris(2-ethylhexyloxy)silane, methyltriphenoxysilane, ethyltriphenoxysilane, vinyltris(2-ethylhexyloxy)silane, vinyltriphenoxysilane, methylvinylbis(2-ethylhexyloxy)silane, ethylvinyldiphenoxysilane, tri-t-butoxymonochlorosilane, triphenoxymonochlorosilane, monochloromethyldiphenoxysilane, monochloromethylbis(2-ethylhexyloxy)silane, monobromoethyldiphenoxysilane, monobromo inyldiphenoxysilane, monobromoisopropenylbis(2-ethylhexyloxy)silane, dichloro-di-t-butoxysilane, ditolyldichlorosilane, di-t-butoxydiiodinesilane, diphenoxyiodinesilane, methyltris(2-methylbutoxy)silane, vinyltris(2-methylbutoxy)silane, monochloromethylbis(2-methylbutoxy)silane, and vinyltris(3-methylbutoxy)silane.

Among these silane compounds, those with n=0 or 1 are preferred, with monochloromethyldiphenoxysilane, vinyltris(2-ethylhexyloxy)silane, monochlorovinyl bis(2-ethylhexyloxy)silane, methyltriphenoxysilane, and ethyltriphenoxysilane being particularly preferred.

These silane compounds can be used either individually or in combinations of two or more.

The modification using these silane compounds can be preferably carried out by adding these silane compounds to the polymerization reaction mixture for preparing the copolymer rubber, when the polymerization conversion reaches 90% to 100%. Of course, the modification agent may be added intermittently or continuously during the polymerization reaction before the polymerization conversion rate reaches 90%.

The amount of these silane compounds to be added, in terms of halogen atoms, phenoxy groups, and ester groups, should be from 0.05 to 5 equivalent, and preferably from 0.1 to 1.5 equivalent, for one atom equivalent of alkali metal in the organic alkali metal compounds required for the preparation of the copolymer rubber.

(2) Method for Preparing Copolymer Rubber of the Formula (2)

In the preparation of the copolymer rubber shown by the above formula (2), an organic alkali metal compound, for example, $LiR^{20}$ (wherein $R^{20}$ represents an alkyl group having 1–20 carbon atoms or a cycloalkyl group having 3–20 carbon atoms), and preferably butyl lithium, is used as an anionic polymerization initiator, and tin tetrachloride, octyl tin trichloride, dioctyl tin dichloride are suitably used as a modification agent.

(3) Method for Preparing Copolymer Rubber of the Formula (3)

In the preparation of the copolymer rubber shown by the above formula (3), an organic alkali metal compound, for example, $LiR^{21}$ (wherein $R^{21}$ represents an alkyl group having 1–20 carbon atoms or a cycloalkyl group having 3–20 carbon atoms), and preferably butyl lithium, is used as an anionic polymerization initiator, and a silane compound shown by the above formula (a) is suitably used as a modification agent.

(4) Method for Preparing Copolymer Rubber of the Formula (4)

In the preparation of the copolymer rubber shown by the above formula (4), an organic alkali metal compound, for example, $R^{22}SnLi$ (wherein $R^{22}$ represents an alkyl group having 1–20 carbon atoms or a cycloalkyl group having 3–20 carbon atoms), and preferably tributyl tin lithium, is used as an anionic polymerization initiator, and a vinyl compound having an amino group shown by the following formula (c) is suitably used as a modification agent.

(c)

wherein $R^{23}$ and $R^{24}$ individually represent an alkyl group having 1–20 carbon atoms or an aryl group having 6–20 carbon atoms.

Given as specific examples of the amino group of the above formula (c) are dimethylamino group, diethylamino group, dipropylamino group, di-n-butylamino group, diisobutylamino group, dipentylamino group, dihexylamino group, di-n-butylamino group, diheptylamino group, dioctylamino group, diallylamino group, dicyclohexylamino group, butylisopropylamino group, dibenzylamino group, methylbenzylamino group, dibenzylamino group, methylhexylamino group, ethylhexylamino group, and the like.

AS the vinyl compound having an amino group with the structure of the formula (c) used as a modification agent, p-dimethylamino styrene, p-diethylamino styrene, p-dimethylaminomethyl styrene, p-(2-dimethylaminoethyl) styrene, m-(2-dimethylaminoethyl) styrene, p-(2-diethylaminoethyl) styrene, p-(2-dimethylaminovinyl) styrene, p-(2-diethylaminovinyl) styrene, vinylbenzyl tetramethylene amine, vinylbenzyl pentamethylene amine, vinylbenzyl hexamethylene amine, vinylbenzyl heptamethylene amine, vinylbenzyl octamethylene amine, and the like can be given.

The amount of such modification agent to be added, in terms of nitrogen atom, is from 0.01 to 0.8 equivalent, preferably from 0.05 to 0.5 equivalent, for one gram atom equivalent of the alkali metal in the alkali metal organic compound. The modification agent is added when the polymerization conversion reaches 90% to 100%, followed by the addition of a stabilizer and the like. The rubber is separated from solvents by steam stripping or direct drying, washed, and dried by vacuum drying or by using a roller mill.

(5) Method for Preparing Copolymer Rubber of the Formula (5)

To manufacture the copolymer rubber of the above formula (5), the polymerization is carried out using any one of the following methods (A)–(C), for example, and the compound of the above formula (a) can be used as a modification agent.

Method (A): A method of reacting an organo monolithium compound with a vinyl compound containing an amino group of the above structure of the formula (c) or a conjugation diolefin compound in a hydrocarbon solvent, followed by copolymerization of the conjugation diolefin and an aromatic vinyl compound.

As the vinyl compound containing an amino group of the structure of formula (c) used in the method (A), the same vinyl compound that is used as a modification agent when manufacturing the copolymer rubber of the above formula (4) can be used.

Method (B): A method of copolymerizing the conjugated diolefin and aromatic vinyl compound, using a reaction product of a secondary amine compound containing the amino group of the above-mentioned structure of formula (c) and an organic alkali metal compound, or an alkali metal amide compound containing the amino group having the above-mentioned structure of formula (c), as a polymerization initiator.

As the secondary amine compound containing the amino group having the structure of formula (c) used in the method (B), dimethylamine, diethylamine, dipropylamine, di-N-butylamine, di-sec-butylamine, dipentylamine, dihexylamine, di-N-octylamine, di-(2-ethylhexyl)amine, dicyclohexylamine, N-methylbenzylamine, diallylamine, piperidine, pyrrolidine, hexamethylene imine, and the like can be given.

Method (C): A method of copolymerizing the conjugated diolefin and aromatic vinyl compound, using a reaction product of a tertiary amine compound containing the amino group of the above-mentioned structure of formula (c) and an organic alkali metal compound, or an alkali metal amide compound containing the amino group having the above-mentioned structure of formula (c), as a polymerization initiator.

As the tertiary amine compound having the structure of formula (c) used in the method (C), N,N-dimethyl-o-toluidine, N,N-dimethyl-p-toluidine, N,N-dimethyl-m-toluidine, $\alpha$-picoline, $\beta$-picoline, $\gamma$-picoline, and the like can be given. The organic alkali metal compound which possesses the amino group of the structure shown by the above-mentioned formula (c) is a compound obtained by replacing the active hydrogen atom in the tertiary amine compound having the amino group of the structure shown by the formula (c) with an alkali metal (Li, Na, K, Rb, or Sc).

Organolithium compounds are given as the organic alkali metal compound to be reacted with the secondary amine compound or tertiary amine compound having the structure of formula (c) in the above-mentioned methods (B) or (C). Specific examples are ethyl lithium, propyl lithium, n-butyl lithium, sec-butyl lithium, tert-butyl lithium, and hexyl lithium, and mixtures of these. Of these, n-butyl lithium and sec-butyl lithium are preferable.

The reaction of the above-mentioned secondary amine compound or tertiary amine compound and the organic alkali metal compound is carried out using these compounds in the amounts so that the molar ratio of the active hydrogen of the secondary amine in the structure of the secondary amine compound or the active hydrogen in the structure of tertiary amine compound and the organic alkali metal compound is in the range from 1:0.2 to 1:5.0, preferably from 1:0.5 to 1:2.0, and more preferably from 1:0.8 to 1:1.2.

The polymerization reaction and modification reaction for obtaining the copolymer rubber of the present invention are carried out usually in the temperature range of 0–120° C. In addition, the reaction may be carried out either at a constant temperature or while raising the temperature. Either a batch polymerization system or a continuous polymerization system may be used for the polymerization reaction.

Ether compounds such as diethyl ether, di-n-butyl ether, ethylene glycol diethyl ether, ethylene glycol dibutyl ether, diethylene glycol dimethyl ether, tetrahydrofuran, $\alpha$-methoxytetrahydrofuran, dimethoxybenzene, and dimethoxyethane and/or tertiary amine compounds such as triethylamine, pyridine, N,N,N',N'-tetramethyl ethylenediamine, and dipiperidinoethane may be optionally added to the polymerization mixture to adjust the microstructure (vinyl bond content) of the conjugated diolefin portion of diolefin-type (co)polymer and improve random distribution properties of aromatic vinyl compounds.

As preferable hydrocarbon solvents used in the preparation of copolymer rubber of the present invention, pentane, hexane, heptane, octane, methylcyclopentane, cyclohexane, benzene, and xylene can be given, for example.

A potassium compound may be added together with the initiator to increase the reactivity of the initiator, to randomly arrange aromatic vinyl compounds introduced in the polymer, or to provide a single chain of aromatic vinyl compounds. Given as examples of the potassium compound which may be added together with the polymerization initiator are potassium alkoxides or potassium phenoxides, such as potassium isopropoxide, potassium-t-butoxide, potassium-t-amyloxide, potassium-N-heptaoxide, potassium benzyloxide, potassium phenoxide; potassium salts of carboxylic acids such as iso-valerianic acid, caprylic acid, lauryl acid, palmitic acid, stearic acid, oleic acid, linolenic acid, benzoic acid, phthalic acid, or 2-ethylhexanoic acid; potassium salts of organic sulfonic acids such as dodecyl benzenesulfonic acid, tetradecyl benzenesulfonic acid, hexadecyl benzenesulfonic acid, or octadecyl benzenesulfonic acid; and potassium salts of organic phosphorous acids such as diethyl phosphite, diisopropyl phosphite, diphenyl phosphite, dibutyl phosphite, and dilauryl phosphite.

These potassium compounds may be added in an amount of 0.005–0.5 mol for one gram atom equivalent of alkali metal in the organic alkali compound used in the preparation of the polymerization initiator. If less than 0.005 mol, a sufficient effect of the addition of potassium compounds, such as improved reactivity of the initiator, random arrangement of aromatic vinyl compounds, or introduction of single chains of aromatic vinyl compounds, may not be achieved. On the other hand, the amount of the potassium compounds of more than 0.5 mol significantly decreases productivity and lowers the efficiency of modification reaction for modifying the polymer terminals with functional groups.

In the preparation of the copolymer rubber of the present invention, an alkali metal alkoxide compound may be added together with the polymerization initiator to increase the polymerization reactivity and the reaction efficiency of reactive polymer terminals with modification agents (including coupling agents). The alkali metal alkoxide compound can be prepared by reacting an alcohol with the corresponding structure and an organic alkali metal compound. This reaction may be carried out in a hydrocarbon solvent in the presence of conjugated diolefin and aromatic vinyl compound prior to the copolymerization of these monomers.

Given as examples of alcohols used in the preparation of these alkali metal alkoxide compounds are tetrahydrofurfuryl alcohol, N,N-dimethyl ethanolamine, N,N-diethyl ethanolamine, 1-piperazine ethanolamine, and the like.

Organolithium compounds can be given as examples of oraganic alkali metal compounds used in the preparation of said alkali metal alkoxide compounds. Specific examples are ethyl lithium, propyl lithium, n-butyl lithium, sec-butyl lithium, tert-butyl lithium, and hexyl lithium, and mixtures of these. Of these, n-butyl lithium and sec-butyl lithium are preferable.

The molar ratio of an alcoholic compound and an organic alkali metal compound is usually from 1:0.7 to 1:5.0, preferably from 1:0.8 to 1:2.0, and more preferably from 1:0.9 to 1:1.2. If the molar ratio of an organic alkali metal compound to an alcoholic compound is more than 1:5.0, the effect on improvement of abrasion resistance and low hysteresis remains low. On the other hand, a molar ratio of the organic alkali metal compound smaller than 1:0.7 remarkably retards the polymerization speed and significantly decreases productivity, giving rise to low efficiency of the modification reaction for modifying the polymer terminals with functional groups.

Isolation of copolymer rubbers of the present invention is carried out by a method used in a conventional solution polymerization method. One example of such a method comprises the addition of a stabilizer and the like, as well as optional components such as extender oil (e.g. aromatic process oil, naphthenic process oil) and liquid polymers with an average molecular weight of 150,000 or less (or solutions of the above-mentioned liquid polymers), to the polymer solution containing the copolymer rubber of the present invention in a liquid state, separating the rubber from solvents by direct drying or steam stripping, washing the rubber, and drying the rubber using a vacuum dryer, a hot-air dryer, or a roller mill.

II. Rubber Composition

The rubber composition of the present invention can be prepared by adding various diene-type rubbers other than the copolymer rubber (A) (hereinafter may be simply called "diene-type rubbers") and various additives to the above conjugated diolefin copolymer rubber. The rubber composition thus obtained is molded into a desired configuration and vulcanized to obtain vulcanized rubber.

Each components for the composition will now be described in more detail.

1. Conjugated Diolefin Copolymer Rubber

The rubber composition of the present invention comprises the conjugated diolefin copolymer rubber thus prepared as a main component in the amount of 30 wt % or more, and preferably 50 wt % or more, of the total rubber components.

2. Diene-type Rubber

Given as the diene-type rubbers which are optionally used in the present invention are at least one rubber components selected from the group consisting of copolymer rubbers of a conjugated diolefin and an aromatic vinyl compound other than the above-mentioned copolymer rubbers, cis-1,4-isoprene rubber, natural rubber, 3,4-isoprene rubber, styrene/butadiene copolymer rubber, styrene/isoprene/butadiene copolymer rubber, cis-1,4-butadiene rubber, trans-1,4-butadiene rubber, low to high vinyl butadiene rubbers (having a vinyl content of 10–90%), acrylonitrile/butadiene copolymer rubber, and chloroprene rubber. It is desirable that the diene-type rubbers have a Mooney viscosity ($ML_{1+4}$, 100° C.) in the range from 20 to 200, and preferably from 25 to 150.

The diene-type rubbers may be added in an amount to satisfy the amount of the above-mentioned conjugated diolefin copolymer rubbers (which is 30 wt % or more, and preferably 50 wt % or more of the total rubber components), specifically, the amount of the diene-type rubbers is less than 70 wt %, and preferably less than 50 wt % of the total rubber components. The addition of the diene-type rubbers in the above range ensures manufacturing of the rubber composition of the present invention at a low cost without substantially impairing its characteristics.

3. Extender Oil

The extensible oil which is optionally used in the present invention has a viscosity specific gravity constant (V.G.C.) of 0.800–0.950, and preferably 0.810–0.920. The viscosity specific gravity constant (V.G.C.) used here is calculated by the following numerical formula (1) and is commonly used as a standard for the evaluation of an acidity.

$$V.G.C.=\{G-0.24-0.022 \log(V-35.5)\}/0.755 \quad (1)$$

In the formula (1), G is a gravity (60/60° F.: a ratio of the mass of the sample at 60° F. and the mass of pure water of the same volume at the same temperature) and V is a saybolt universal viscosity (SUS) at 210° F.

The use of such extensible oil together with the above-mentioned conjugated diolefin copolymer rubber ensures production of stable oil-extended rubber, because the tin-carbon bonds which are present in the copolymer rubber are not broken in an oil-extended state.

The extensible oil is used in an amount from 5 to 60 parts by weight, and preferably from 10 to 50 parts by weight, for 100 parts by weight of the conjugated diolefin copolymer rubbers.

Conventionally known oil extension methods can be used without any specific limitations. As a typical example, a method of adding extensible oil to the polymer solution can be given. This method is preferable, because the rubber can be uniformly extended with oil.

4. Fillers (Reinforcing Agents)

Carbon black, silica, carbon-silica dual-phase-filler, clay, calcium carbonate, magnesium carbonate, and the like can be given as examples of the fillers (reinforcing agents) which can be added to the rubber composition of the present invention. Of these, the combined use of carbon black and silica, the use of carbon-silica dual-phase-fillers alone, or the combined use of carbon-silica dual-phase-filler and carbon black and/or silica are preferable.

(1) Carbon Black

Carbon black manufactured by a furnace method and having a nitrogen adsorption specific surface area of 50–200 m²/g and DBP oil absorption of 80–200 ml/100 g, for example, FEF, HAF, ISAF, or SAF class carbon black, is preferable. High agglomeration type carbon black is particularly preferable.

The carbon black is used in an amount from 2 to 100 parts by weight, and preferably from 5 to 95 parts by weight, for 100 parts by weight of the total of the conjugated diolefin copolymer rubbers and diene-type rubbers.

(2) Silica

As silica, wet process silica, dry process silica, and synthetic silicate-type silica are given, for example. Silica with a small particle diameter exhibits a high reinforcing effect. Small diameter, high agglomeration-type silica (i.e. that having a large surface area and high oil absorptivity) exhibits excellent dispensability in rubber, desirable properties, and superior processability. An average particle diameter of silica, in terms of a primary particle diameter, is preferably from 5 to 60 μm, and more preferably from 10 to 35 μm.

Moreover, the specific surface area of the silica particles (measured by the BET method) is preferably from 45 to 280 m²/g.

Silica is used in an amount from 30 to 100 parts by weight, and preferably from 35 to 95 parts by weight, for 100 parts by weight of the total of the conjugated diolefin copolymer rubbers and diene-type rubbers.

Carbon black and silica may be added together, in which case the total amount of carbon black and silica added is from 30 to 100 parts by weight, and preferably from 35 to 95 parts by weight, for 100 parts by weight of the total of the conjugated diolefin copolymer rubbers and diene-type rubbers.

If carbon black and/or silica are added to the conjugated diolefin copolymer rubber in the amount of above range, these fillers exhibiting a reinforcing effect can be homogeneously dispersed in the rubber, producing a rubber composition with excellent rolling and extruding processability and vulcanized rubbers exhibiting various excellent properties such as favorable hysteresis loss properties, rolling resistance, improved wet skid resistance, abrasion resistance, and breaking strength.

(3) Carbon-silica Dual-phase-filler

Carbon-silica dual-phase-filler may be used either independently or in combination with carbon black and/or silica in the present invention. Even in the case where added alone, carbon-silica dual-phase-fillers can exhibits the same effects as those obtained by the combined use of carbon black and silica.

Carbon-silica dual-phase-filler is so called silica-coating-carbon black made by coating silica over the surface of carbon black, and is commercially available under the trademark CRX2000, CRX2002, or CRX2006 (products of Cabot Co.). Carbon-silica dual-phase-fillers are used in an amount from 30 to 100 parts by weight, and preferably from 35 to 95 parts by weight, for 100 parts by weight of the total of the conjugated diolefin copolymer rubbers and diene-type rubbers.

In the present invention, carbon-silica dual-phase-filler can be used in combinations with other fillers. Other fillers which can be used together with carbon-silica dual-phase-filler include, but are not limited to, carbon black, silica, clay, calcium carbonate, and magnesium carbonate, for example. Of these fillers, use of carbon black and silica, either individually or in combination, is preferable. These other fillers is added in an amount (as a total of such fillers and carbon-silica dual-phase-filler) from 30 to 100 parts by weight, and preferably from 35 to 95 parts by weight, for 100 parts by weight of the total of the conjugated diolefin copolymer rubbers and diene-type rubbers.

(4) Silane Coupling Agent

It is preferable to add a silane coupling agent, when silica or carbon-silica dual-phase-filler is used as a filler, in an amount from 1 to 20 parts by weight, and preferably from 2 to 15 parts by weight, for 100 parts by weight of the silica and/or carbon-silica dual-phase-filler.

A silane coupling agent which has both a functional group reactive with silica surface such as an alkoxysilyl group and a functional group reactive with a carbon-carbon double bond of rubber such as polysulfide group, mercapto group, or epoxy group in the molecule is preferable. For example, bis-(3-triethoxysilylpropyl)tetrasulfide, bis-(2-triethoxysilylethyl)tetrasulfide, 3-mercaptopropyltrimethoxysilane, 3-triethoxysilylpropyl-N,N-dimethylthiocarbamoyltetrasulfide, 3-triethoxysilylpropylbenzothiazole tetrasulfide, and the like can be given. The use of such a silane coupling agent increases the reinforcing effect brought about by the combined use of carbon black and silica or the use of carbon-silica dual-phase-filler as fillers.

5. Vulcanizing Agent

A vulcanizing agent may be added to the rubber composition of the present invention in an amount from 0.5 to 10 parts by weight, and preferably from 1 to 6 parts by weight, for 100 parts by weight of the total of the conjugated diolefin copolymer rubbers and diene-type rubbers.

Sulfur is a typical vulcanizing agent. Sulfur-containing compounds, peroxides, and the like can be given as other examples of vulcanizing agent.

A vulcanizing accelerator of sulfene amide-type, guanidine-type, or thiuram-type, for example, can be used together with a vulcanizing agent, as required. Other additives such as zinc white, vulcanization auxiliaries, aging preventives, processing adjuvants, and the like may be optionally added.

6. Preparation of the Composition

The rubber composition of the present invention can be prepared by kneading the above-described copolymer rubbers, diene-type rubbers, extensible oil, fillers (carbon black, silica, carbon-silica dual-phase-filler, etc.), silane coupling agents, and other additives in a mixer at 70 to 180° C., for example. After cooling, vulcanizing agents such as sulfur, vulcanizing accelerators, and the like are added, and the resulting mixture is blended using a Banbury mixer or mixing roller mill, formed into a desired shape, and vulcanized at 140 to 180° C., for example, thereby obtaining a vulcanized rubber product with any optional shape.

7. Application of the Composition

Because the vulcanized rubber obtained from the rubber composition of the present invention exhibits extremely excellent low rolling resistance and superior wet skid performance, the rubber composition of the present invention can be suitably used for tires such as treads, side walls, and carcasses, as well as other industrial products such as belts, hoses, vibration-proof rubber, and footwear.

The present invention will now be described in more detail by way of examples, which should not be construed as limiting the present invention.

EXAMPLES

Various measuring methods used in the examples are as follows.

(1) Vinyl Content of Conjugated Diolefin Portions

IR spectroscopy (Morelo method) was used.

(2) Bonding Styrene Content (%)

The bonding styrene content determined using a calibration curve which was measured by IR spectroscopy.

(3) Mooney Viscosity ($ML_{1+4}$, 100° C.)

The Mooney viscosity was measured according to JIS K6300 using an L-rotor with a preheating time of one minute and a rotor operation time of 4 minutes at a temperature of 100° C.

(4) Alkoxysilyl Group Content (mmol/100 g)

Quantitative determination was carried out using a calibration curve which was prepared by the Si—C bond absorption in the vicinity of 1,160 $cm^{-1}$ by IR spectrum. The number of mols of the alkoxysilyl groups was determined by diving the quantitatively determined value by the polystyrene-reduced number average molecular weight (Mn) obtained by the GPC method and the molecular weight of the alkoxysilyl group.

(5) Tin-carbon Bond Content (mmol/100 g)

The tin-carbon bond content was determined by re-precipitating the copolymer in a toluene/methanol mixture and analyzing the tin concentration by the atomic absorption method using Hitachi 170-70 (trade name, manufactured by Hitachi, Ltd.).

(6) Amino Group Content (mmol/100 g)

The amino group content was quantitatively measured by the acid-base titration method using the perchloric acid-acetic acid solution described in J. Anal. Chem., Vol. 24, page 564, Robert. T. Keen, James. S. Fritz (1952). A calibration curve was prepared from a solution of tri-n-octyl amine with a known concentration, using chloroform as a solvent to dissolve the samples and methyl violet as a titration indicator.

(7) Evaluation of Vulcanized Rubber Properties

Compositions according to the formulation shown in Table 4 were kneaded in a 250 cc laboratory plast-mill, vulcanized at 145° C. for a prescribed period of time. Properties (a)–(d) were measured using the vulcanized rubbers.

(a) Tensile strength (300% modulus): Measured according to JIS K6301

(b) tan δ(50° C.) and at tan δ(0° C.): Measured using a dynamic spectrometer manufactured by Rheometrix Co. (U.S.A) under the conditions of tensile dynamic strain of 1% and a frequency of 10 Hz at 50° C. The larger the index, the better the rolling resistance. tan δ(0° C.) was measured using the same equipment at tensile dynamic strain of 0.1% and a frequency of 10 Hz at 0° C. The larger the index, the better the wet skid resistance.

(c) Lambourn abrasion index: The index was expressed by the wear amount at 25% abrasion loss, measured using a Lanbourn-type abrader at room temperature. The larger the index, the better the wear resistance is.

(d) Processability:

(i) Mixing processability was evaluated by the amount of fillers remaining three minutes after start of mixing.

(ii) Winding to rollers, texture of extruded products, settling conditions of rubbers after mixing, glossiness and appearance were evaluated by naked eye observations.

(Synthesis and Evaluation of Conjugated Diolefin Copolymer Rubber)

Example 1

(Synthesis of Copolymer Rubber A)

A 5 1 autoclave reaction vessel of which the internal atmosphere was replaced by nitrogen was charged with 2,500 g of cyclohexane, 37 g of tetrahydrofuran, 100 g of styrene, and 365 g of 1,3-butadiene. After adjusting the temperature of the content in the reaction vessel to 20° C., 3.45 mmol of n-butyl lithium was added to initiate the polymerization. The polymerization was carried out under thermally insulated conditions and the maximum temperature reached 85° C.

After the polymerization conversion rate reached 100%, 35 g butadiene was added and polymerized. Then, 0.5 mmol tin tetrachloride and 0.9 mmol of methyltriphenoxysilane was added to carry out the modified reactions for 15 minutes. After polymerization, 2,6-di-tert-butyl-p-cresol was added, the solvents were removed by steam stripping, and rubber was dried by a heat roll at 115° C., thereby obtaining Copolymer Rubber A. The composition and properties of the Copolymer Rubber A thus obtained are shown in Table 4.

The rubber composition prepared from the Copolymer Rubber A according to the formulation I shown in Table 6 was vulcanized to evaluate the properties of vulcanized rubber. The results are shown in Table 7.

Examples 2–7

(Synthesis and Evaluation of Copolymer Rubbers B–G)

Copolymer Rubbers (modified polymers) B, C, D, E, F, and G were prepared in the same manner as in Example 1, except for using the polymer compositions and modification formulations shown in Tables 1 and 2. The composition and properties of the Copolymer Rubbers B–G are shown in Table 4. The rubber composition prepared from the Copolymer Rubbers B–G according to the formulation I shown in Table 6 was vulcanized to evaluate the properties of vulcanized rubber. The results are shown in Table 7.

Comparative Examples 1–4

(Synthesis and Evaluation of Copolymer Rubbers H–K)

Copolymer Rubbers H, I, and J were prepared in the same manner as in Example 1, except for using the polymer compositions and modification formulations shown in Tables 3. The composition and properties of the Copolymer Rubbers thus obtained are shown in Table 5. The rubber compositions prepared from the Copolymer Rubbers H–K according to the formulation I shown in Table 6 were vulcanized to evaluate the properties of vulcanized rubbers. The results are shown in Table 8.

Examples 8–10

The rubber compositions were prepared from the Copolymer Rubber C which was synthesized in Example 3 according to the formulation II (Example 8), formulation IV (Example 9), and the formulation III (Example 10) shown in Table 6. These rubber compositions were vulcanized to evaluate the properties of vulcanized rubbers. The results are shown in Table 7.

Example 11

The Copolymer Rubbers C which was synthesized in Example 3 was extended using 30 parts by weight of an extender oil (Fukkol FLEX#140 (V.G.C.=0.901) manufactured by Fuji Oil Co., Ltd.). A rubber composition was prepared from the extended rubber according to the formulation II shown in Table 6 and vulcanized to evaluated the properties. The results are shown in Table 7. The Mooney viscosity (OE-MV) of the rubber composition (oil extended rubber) was 35.

Comparative Example 5

A rubber composition was prepared using the Copolymer Rubber I synthesized in the Comparative Example 2 according to the formulation IV shown in Table 6. The resulting rubber composition was vulcanized to evaluate the properties of vulcanized rubber. The results are shown in Table 8.

TABLE 1

| | Example | | | |
|---|---|---|---|---|
| | 1 | 2 | 3 | 4 |
| | \multicolumn{4}{c}{Copolymer rubber} | | | |
| | A | B | C | D |
| Polymerization formulation | | | | |
| Solvent | | | | |
| Cyclohexane (g) | 2500 | 2500 | 2500 | 2500 |
| Monomers | | | | |
| Styrene (g) | 100 | 100 | 100 | 150 |
| Butadiene (g) | 365 | 400 | 365 | 320 |
| Vinyl bond adjusting agent | | | | |
| Tetrahydrofuran (g) | 37 | 25 | 25 | 6.3 |
| Initiator | | | | |
| Pyrrolidine (mmol) | | | 3.45 | 3.45 |
| Tributyl tin lithium (mmol) | | 3.45 | | |
| n-Butyl lithium (mmol) | 3.45 | | 3.45 | 3.45 |
| Randomization agent | | | | |
| DBS *4) | | | | |
| Modification formulation | | | | |
| Butadiene added before modification (g) | 35 | | 35 | 30 |
| Modification agent | SnCl$_4$/Si-1 *1) | Si-1 | SnCl$_4$/Si-2 *2) | SnCl$_4$/Si-1 |
| Amount of modification agent (mmol) | 0.5/0.9 | 1.7 | 0.3/1.5 | 0.8/0.4 |

*1) Si-1: Methyltriphenoxysilane
*2) Si-2: Bis(3-tributoxysilylpropyl)tetrasulfide
*4) DBS: potassium dodecybenzenesulfonate

TABLE 2

| | Example | | | |
|---|---|---|---|---|
| | 5 | 6 | 7 | 11 |
| | \multicolumn{4}{c}{Copolymer rubber} | | | |
| | E | F | G | C |
| Polymerization formulation | | | | |
| Solvent | | | | |
| Cyclohexane (g) | 2500 | 2500 | 2500 | 2500 |
| Monomers | 175 | 175 | 100 | 100 |
| Styrene (g) | | | | |
| Butadiene (g) | 297 | 297 | 400 | 365 |
| Vinyl bond adjusting agent | | | | |
| Tetrahydrofuran (g) | 11 | 1.2 | 25 | 25 |
| Initiator | | | | |
| Pyrrolidine (mmol) | 3.45 | 3.45 | | 3.45 |
| Tributyl tin lithium (mmol) | | | 3.45 | |
| n-Butyl lithium (mmol) | 3.45 | 3.45 | | 3.45 |
| DBS *4) | | 0.3 | | |
| Modification formulation | | | | |
| Butadiene added before | 28 | 28 | | 35 |
| Modification agent | SnCl$_4$/Si-1 *1) | SnCl$_4$/Si-2 *2) | N-1 *3)/Si-1 *1) | SnCl$_4$/Si-2 *2) |
| Amount of modification agent (mmol) | 0.5/0.9 | 0.5/0.9 | 1.0/1.3 | 0.3/1.5 |

*1) Si-1: Methyltriphenoxysilane
*2) Si-2: Bis(3-tributoxysilylpropyl)tetrasulfide
*3) N-1: 4,4'-Bis(dimethylamino)benzophenone
*4) DBS: Potassium dodecybenzenesulfonate

TABLE 3

| | Comparative Example | | | |
|---|---|---|---|---|
| | 1 | 2 | 3 | 4 |
| | \multicolumn{4}{c}{Copolymer rubber} | | | |
| | H | I | J | K |
| Polymerization formulation | | | | |
| Solvent | | | | |
| Cyclohexane (g) | 2500 | 2500 | 2500 | 2500 |
| Monomers | | | | |
| Styrene (g) | 100 | 100 | 100 | 100 |
| Butadiene (g) | 365 | 400 | 365 | 400 |
| Vinyl bond adjusting agent | | | | |
| Tetrahydrofuran (g) | 25 | 25 | 25 | 25 |
| Initiator | | | | |
| Pyrrolidine (mmol) | | | 3.45 | 3.45 |
| Tributyl tin lithium (mmol) | | | | |
| n-Butyl lithium (mmol) | 3.45 | 3.45 | 3.45 | 3.45 |
| Randomization agent | | | | |
| DBS *4) | | | | |

TABLE 3-continued

|  | Comparative Example | | | |
|---|---|---|---|---|
|  | 1 | 2 | 3 | 4 |
|  | Copolymer rubber | | | |
|  | H | I | J | K |
| Modification formulation | | | | |
| Butadiene added before modification (g) | 35 |  | 35 |  |
| Modification agent | SnCl$_4$ | Si-1 *1) | SnCl$_4$ | Si-1 *1) |
| Amount of modification agent (mmol) | 1.1 | 1.7 | 1.1 | 1.7 |

*1) Si-1: Methyltriphenoxysilane
*4) DBS: Potassium dodecybenzenesulfonate

TABLE 4

|  | Example | | | | | | |
|---|---|---|---|---|---|---|---|
|  | 1 | 2 | 3 | 4 | 5 | 6 | 7 |
| Copolymer rubber | A | B | C | D | E | F | G |
| Characteristics of copolymer rubber | | | | | | | |
| Amount of bonding styrene (mol %) | 20 | 20 | 20 | 30 | 35 | 35 | 20 |
| Vinyl content (%) | 68 | 60 | 60 | 35 | 45 | 23 | 60 |
| Mooney viscosity (mmol/100 g) | 70 | 65 | 71 | 78 | 76 | 75 | 60 |
| Alkoxysilyl content | 0.2 | 0.4 | 1.1 | 0.1 | 0.2 | 0.9 | 0.4 |
| Sn—C bond content (mmol/100 g) | 0.1 | 0.6 | 0.06 | 0.15 | 0.1 | 0.1 | 0.6 |
| Amino group content (mmol/100 g) | — | — | 0.62 | 0.65 | 0.63 | 0.61 | 0.2 |
| MWD | 1.4 | 1.5 | 1.3 | 1.3 | 1.3 | 1.2 | 1.5 |
| Type of MWD *5) | Tri | Tri | Tri | Tri | Tri | Tri | Tri |

*5) Tri: Trimodal

TABLE 5

|  | Comparative Example | | | |
|---|---|---|---|---|
|  | 1 | 2 | 3 | 4 |
|  | Copolymer rubber | | | |
|  | H | I | J | K |
| Characteristics of copolymer rubber | | | | |
| Amount of bonding styrene (mol %) | 20 | 20 | 20 | 20 |
| Vinyl content (%) | 60 | 60 | 61 | 60 |
| Mooney viscosity | 77 | 63 | 81 | 65 |
| Alkoxysilyl content (mmol/100 g) | — | 0.3 | — | 0.3 |
| Sn—C bond content (mmol/100 g) | 0.2 | — | 0.2 | — |
| Amino group content (mmol/100 g) | — | — | 0.61 | 0.62 |
| MWD | 1.7 | 1.2 | 1.7 | 1.3 |
| Type of MWD *6) | Bi | Bi | Bi | Bi |

*6) Bi: Bimodal

TABLE 6

| Formulation (phr) | I | II | III | IV |
|---|---|---|---|---|
| Copolymer rubber | 70 | 100 | 70 | 70 |
| Natural rubber | 30 |  | 30 | 30 |
| Carbon black *5) | 20 |  |  | 60 |
| Silica *6) | 40 |  | 70 |  |
| Dual phase filler *7) |  | 60 |  |  |
| Silane coupling agent *8) | 4 | 1.5 | 7 |  |
| Oil-1 *9) | 30 |  | 30 | 30 |
| Oil-2 *10) |  | 30 |  |  |
| Stearic acid | 2 | 2 | 2 | 2 |
| Antioxidant *11) | 1 | 1 | 1 | 1 |
| Zinc oxide | 3 | 3 | 3 | 3 |
| Vulcanizing accelerator CZ' *12) | 2 | 2 | 2 | 2 |
| Vulcanizing accelerator D*13) | 1.5 | 1.5 | 1.5 |  |
| Sulfur | 2 | 2 | 2 | 2 |

*5) Diablack, manufactured by Mitsubishi Chemical Corp.
*6) Nipsil AQ, manufactured by Nippon Silica Industrial Co., Ltd.
*7) CRX2002, manufactured by Cabbot Co.
*8) Si69, manufactured by Degussa Japan Co., Ltd.
*9) Aromax #3, manufactured by Fuji Oil Co., Ltd.
*10) Fukkol FLEX#140, manufactured by Fuji Oil Co., Ltd.).
*11) Nocklac 810NA, manufactured by Ouchi Shinko Chemical Industrial Co., Ltd.
*12) Nockseller CZ, manufactured by Ouchi Shinko Chemical Industrial Co., Ltd.
*13) Nockseller D, manufactured by Ouchi Shinko Chemical Industrial Co., Ltd.

TABLE 7

|  | Example | | | | | | | | | | |
|---|---|---|---|---|---|---|---|---|---|---|---|
|  | 1 | 2 | 3 | 4 | 5 | 6 | 7 | 8 | 9 | 10 | 11 |
| Formulation No. (Table 6) | I | I | I | I | I | I | I | II | IV | III | II |
| Copolymer Rubber | A | B | C | D | E | F | G | C | C | C | C |
| Mooney viscosity | 63 | 73 | 69 | 79 | 65 | 64 | 78 | 65 | 60 | 58 | 63 |
| Roller winding | ⊚ | ⊚ | ⊚ | ⊚ | ⊚ | ⊚ | ○ | ○ | ⊚ | ⊚ | ⊚ |
| Extruded product texture | ⊚ | ○ | ○ | ○ | ⊚ | ○ | ○ | ⊚ | ⊚ | ⊚ | ⊚ |
| tan δ (0° C.) | 0.43 | 0.34 | 0.35 | 0.34 | 0.48 | 0.24 | 0.34 | 0.36 | 0.49 | 0.45 | 0.36 |
| tan δ (50° C.) | 0.16 | 0.14 | 0.12 | 0.13 | 0.15 | 0.12 | 0.14 | 0.12 | 0.16 | 0.13 | 0.11 |

TABLE 7-continued

|  | Example | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Hardness (JISA) | 65 | 66 | 65 | 65 | 66 | 66 | 65 | 65 | 64 | 66 | 64 |
| Abrasion resistance | 106 | 114 | 103 | 108 | 107 | 136 | 119 | 105 | 127 | 110 | 110 |

◎: Excellent
o: Good

TABLE 8

|  | Comparative Example | | | | |
| --- | --- | --- | --- | --- | --- |
|  | 1 | 2 | 3 | 4 | 5 |
| Formulation No. (Table 6) | I | I | I | I | IV |
| Copolymer Rubber | H | I | J | K | I |
| Mooney viscosity | 50 | 81 | 71 | 84 | 85 |
| Roller winding | ◎ | o | ◎ | o | o |
| Extruded product texture | ◎ | Δ | o | Δ | o |
| tan δ (0° C.) | 0.32 | 0.33 | 0.34 | 0.32 | 0.36 |
| tan δ (50° C.) | 0.16 | 0.15 | 0.14 | 0.14 | 0.21 |
| Hardness (JISA) | 65 | 65 | 66 | 67 | 63 |
| Abrasion resistance | 100 | 105 | 100 | 108 | 112 |

◎: Excellent
o: Good
Δ: Poor

The results of Table 7 and Table 8 clearly indicate the following facts. The rubber compositions of Examples 1 to 11 using the conjugated diolefin copolymer rubber of the present invention exhibited superior processability and well balanced low hysteresis loss (small tan δ at 50° C.) and abrasion resistance, without impairing wet skid properties (i.e. while maintaining large tan δ at 0° C.). This also applied to the compositions incorporating carbon black (Example 9), silica (Example 10), carbon-silica dual-phase filler which was previously extended with oil (dual phase filler) (Example 11), and both carbon black and silica (Examples 1–7).

On the other hand, the rubber compositions of Comparative Examples 1 and 3 using conjugated diolefin copolymer rubber H or J which does not contain a non-hydrolyzable alkoxysilyl group exhibited only poor abrasion resistance, and the rubber compositions of Comparative Examples 2 and 4 using conjugated diolefin copolymer rubber I or K which does not have a tin-carbon bond exhibited poor processability. The rubber composition of Comparative Example 5 comprising the above-mentioned conjugated diolefin copolymer rubber I and carbon exhibited inferior low hysteresis loss.

In addition, it can be seen from comparison of Example 11 and Example 8 that processability improvement is more remarkable when a rubber composition previously extended with oil is used.

As mentioned above, the present invention provide a conjugated diolefin copolymer rubber which exhibits superior processability and can produce vulcanized products exhibiting well-balanced improved properties such as wet skid properties, low hysteresis loss properties, abrasion resistance, and breaking strength, as well as excellent processability, irrespective of the types and combinations of fillers to be added, and is useful as a tread material for low fuel consumption tires, large tires, and high performance tires.

Obviously, numerous modifications and variations of the present invention are possible in light of the above teachings. It is therefore to be understood that, within the scope of the appended claims, the invention may be practiced otherwise than as specifically described herein.

What is claimed is:

1. A conjugated diolefin copolymer rubber, prepared by the copolymerization of a conjugated diolefin and a vinyl aromatic compound, the conjugated diolefin copolymer rubber (1) having a content of the bonded vinyl aromatic compound of 5–50 wt %, (2) containing 0.01–5.0 mmol of an alkoxysilyl group having substantially non-hydrolyzable Si—O—R bond, wherein R indicates a hydrocarbon group having 4–20 carbon atoms, and 0.01–2.0 mmol of a tin-carbon bond for 100 g of the copolymer rubber, and (3) having a poly-modal type molecular weight distribution.

2. A conjugated diolefin copolymer rubber, prepared by the copolymerization of a conjugated diolefin and a vinyl aromatic compound, the conjugated diolefin copolymer rubber (1) having a content of the bonded vinyl aromatic compound of 5–50 wt %, (2') containing 0.01–5.0 mmol of an alkoxysilyl group having substantially non-hydrolyzable Si—O—R bond, wherein R indicates a hydrocarbon group having 420 carbon atoms, 0.01–2.0 mmol of a tin-carbon bond, and 0.01–1.5 mmol of an amino group, for 100 g of the copolymer rubber, and (3) having a poly-modal type molecular weight distribution.

3. The conjugated diolefin copolymer rubber according to claim 1, which is a mixture of a conjugated diolefin copolymer rubber containing an alkoxysilyl group having substantially non-hydrolyzable Si—O—R bond, wherein R indicates a hydrocarbon group having 4–20 carbon atoms, and a conjugated diolefin copolymer rubber containing a tin-carbon bond.

4. The conjugated diolefin copolymer rubber according to claim 2, which is a mixture of a conjugated diolefin copolymer rubber containing an amino group and an alkoxysilyl group having substantially non-hydrolyzable Si—O—R bond, wherein R indicates a hydrocarbon group having 4–20 carbon atoms, and a conjugated diolefin copolymer rubber containing an amino group and a tin-carbon bond.

5. A rubber composition comprising 100 parts by weight of the conjugated diolefin copolymer rubber of claim 1 and 5–60 parts by weight of an extensible oil with a viscosity specific gravity constant V.G.C. of 0.800–0.950.

6. A rubber composition comprising 100 parts by weight of the conjugated diolefin copolymer rubber of claim 2 and 5–60 parts by weight of an extensible oil with a viscosity specific gravity constant V.G.C. of 0.800–0.950.

7. A rubber composition comprising the conjugated diolefin copolymer rubber of claim 1 in an amount of 30 wt % or more of the total amount of rubber components, and carbon black or silica, or both carbon black and silica, in an amount of 2–100 parts by weight or 30–100 parts by weight, respectively, for 100 parts by weight of the total amount of rubber components and, when silica is contained, a silane coupling agent in an amount of 1–20 parts by weight for 100 parts by weight of silica.

8. A rubber composition comprising the conjugated diolefin copolymer rubber of claim 2 in an amount of 30 wt % or more of the total amount of rubber components, and carbon black or silica, or both carbon black and silica, in an amount of 2–100 parts by weight or 30–100 parts by weight, respectively, for 100 parts by weight of the total amount of rubber components and, when silica is contained, a silane coupling agent in an amount of 1–20 parts by weight for 100 parts by weight of silica.

9. A rubber composition comprising, the conjugated diolefin copolymer rubber of claim 1 in an amount of 30 parts by weight or more of the total amount of rubber components and (a) a total of 30–100 parts by weight of carbon black and silica for 100 parts by weight of the total amount of rubber components, (b) 30–100 parts by weight of carbon-silica dual-phase-fillers for 100 parts by weight of the total amount of rubber components, or (c) a total of 30–100 parts by weight of carbon-silica dual-phase-fillers and carbon black and/or silica for 100 parts by weight of the total amount of rubber components, and a silane coupling agent in an amount of 1–20 parts by weight for 100 parts by weight of the carbon-silica dual-phase-fillers and carbon black and/or silica.

10. A rubber composition comprising, the conjugated diolefin-type copolymer rubber of claim 2 in an amount of 30 parts by weight or more of the total amount of rubber components and (a) a total of 30–100 parts by weight of carbon black and silica for 100 parts by weight of the total amount of rubber components, (b) 30–100 parts by weight of carbon-silica dual-phase-fillers for 100 parts by weight of the total amount of rubber components, or (c) a total of 30–100 parts by weight of carbon-silica dual-phase-fillers and carbon black and/or silica for 100 parts by weight of the total amount of rubber components, and a silane coupling agent in an amount of 1–20 parts by weight for 100 parts by weight of the carbon-silica dual-phase-fillers and carbon black and/or silica.

11. A rubber composition comprising, 100 parts by weight of the conjugated diolefin copolymer rubber of claim 1, 5–60 parts by weight of an extensible oil with a viscosity specific gravity constant V. G. C. of 0.800–0.950, 2–100 parts by weight of carbon black and/or 30–100 parts by weight of silica for 100 parts by weight of the total amount of rubber components and, when silica is contained, a silane coupling agent in an amount of 1–20 parts by weight for 100 parts by weight of silica, wherein the content of the conjugated diolefin copolymer rubber of claim 1 in the rubber composition is 30 wt % or more of the total amount of rubber components.

12. A rubber composition comprising, 100 parts by weight of the conjugated diolefin copolymer rubber of claim 2, 5–60 parts by weight of an extensible oil with a viscosity specific gravity constant V.G.C. of 0.800–0.950, 2–100 parts by weight of carbon black and/or 30–100 parts by weight of silica for 100 parts by weight of the total amount of rubber components and, when silica is contained, a silane coupling agent in an amount of 1–20 parts by weight for 100 parts by weight of silica, wherein the content of the conjugated diolefin copolymer rubber of claim 2 in the rubber composition is 30 wt % or more of the total amount of rubber components.

13. A rubber composition comprising 100 parts by weight of the conjugated diolefin copolymer rubber of claim 1, 5–60 parts by weight of an extensible oil with a viscosity specific gravity constant V.G.C. of 0.800–0.950, and (a) a total of 30–100 parts by weight of carbon black and silica for 100 parts by weight of the total amount of rubber components, (b) 30–100 parts by weight of carbon-silica dual-phase-fillers for 100 parts by weight of the total amount of rubber components, or (c) a total of 30–100 parts by weight of carbon-silica dual-phase-fillers and carbon black and/or silica for 100 parts by weight of the total amount of rubber components, and a silane coupling agent in an amount of 1–20 parts by weight for 100 parts by weight of the carbon-silica dual-phase-fillers and carbon black and/or silica, wherein the content of the conjugated diolefin copolymer rubber of claim 1 in the rubber composition is 30 wt % or more of the total amount of rubber components.

14. A rubber composition comprising 100 parts by weight of the conjugated diolefin copolymer rubber of claim 2, 5–60 parts by weight of an extensible oil with a viscosity specific gravity constant V.G.C. of 0.800–0.950, and (a) a total of 30–100 parts by weight of carbon black and silica for 100 parts by weight of the total amount of rubber components, (b) 30–100 parts by weight of carbon-silica dual-phase-fillers for 100 parts by weight of the total amount of rubber components, or (c) a total of 30–100 parts by weight of carbon-silica dual-phase-fillers and carbon black and/or silica for 100 parts by weight of the total amount of rubber components, and a silane coupling agent in an amount of 1–20 parts by weight for 100 parts by weight of the carbon-silica dual-phase-fillers and carbon black and/or silica, wherein the content of the conjugated diolefin copolymer rubber of claim 2 in the rubber composition is 30 wt % or more of the total amount of rubber components.

15. The rubber composition of claim 1, which further comprises at least one rubber component selected from the group consisting of conjugated diolefin-vinyl aromatic compound copolymer rubbers other than that defined in claim 1, cis-1,4-polyisoprene rubber, natural rubber, 3,4-polyisoprene rubber, styrene/butadiene copolymer rubber, styrene/isoprene/butadiene copolymer rubber, cis-1,4-butadiene rubber, trans-1,4-butadiene rubber, low to high vinyl butadiene rubbers having a vinyl content of 10–90%, acrylonitrile/butadiene copolymer rubber, and polychloroprene rubber.

16. The rubber composition of claim 2, which further comprises at least one rubber component selected from the group consisting of conjugated diolefin-vinyl aromatic compound copolymer rubbers other than that defined in claim 2, cis-1,4-polyisoprene rubber, natural rubber, 3,4-polyisoprene rubber, styrene/butadiene copolymer rubber, styrene/isoprene/butadiene copolymer rubber, cis-1,4-butadiene rubber, trans-1,4-butadiene rubber, low to high vinyl butadiene rubbers having a vinyl content of 10–90%, acrylonitrile/butadiene copolymer rubber, and polychloroprene rubber.

* * * * *

UNITED STATES PATENT AND TRADEMARK OFFICE
CERTIFICATE OF CORRECTION

PATENT NO. : 6,344,518 B1
DATED : February 5, 2002
INVENTOR(S) : Kobayashi et al.

It is certified that error appears in the above-identified patent and that said Letters Patent is hereby corrected as shown below:

Column 30,
Line 37, "420 carbon atoms," should read -- 4-20 carbon atoms, --.

Signed and Sealed this

Twenty-fifth Day of June, 2002

Attest:

Attesting Officer

JAMES E. ROGAN
Director of the United States Patent and Trademark Office